United States Patent
Barbas et al.

(10) Patent No.: US 11,520,804 B1
(45) Date of Patent: Dec. 6, 2022

(54) ASSOCIATION RULE MINING

(71) Applicant: International Business Machines Corporation, Armonk, NY (US)

(72) Inventors: Pedro Miguel Barbas, Dunboyne (IE); David Kelly, Robertstown (IE); Clara Liu, Markham (CA); Enzo Cialini, Hamilton (CA); Manohar Bashyam, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 17/319,774

(22) Filed: May 13, 2021

(51) Int. Cl.
*G06F 16/26* (2019.01)
*G06F 16/2458* (2019.01)

(52) U.S. Cl.
CPC .......... *G06F 16/26* (2019.01); *G06F 16/2465* (2019.01)

(58) Field of Classification Search
CPC .............................. G06F 16/26; G06F 16/2465
See application file for complete search history.

(56) References Cited

U.S. PATENT DOCUMENTS

| | | | |
|---|---|---|---|
| 7,962,483 B1* | 6/2011 | Thomas | G06N 5/025 707/755 |
| 8,250,105 B2 | 8/2012 | Bollinger | |
| 9,904,949 B1 | 2/2018 | Tavernier | |
| 2007/0219992 A1 | 9/2007 | Bollinger | |
| 2007/0220030 A1* | 9/2007 | Bollinger | G06F 16/2465 |
| 2007/0250522 A1 | 10/2007 | Perrizo | |
| 2016/0179903 A1 | 6/2016 | Bittmann | |
| 2021/0334277 A1* | 10/2021 | Thai | G06F 7/14 |

FOREIGN PATENT DOCUMENTS

| | | |
|---|---|---|
| CN | 111159436 A | 5/2020 |
| CN | 107622121 B | 6/2020 |
| KR | 1020080026943 A | 3/2008 |

OTHER PUBLICATIONS

Aqra et al., "Incremental Algorithm for Association Rule Mining under Dynamic Threshold", Applied Sciences 2019, 9, 5398, DOI: 10.3390/app9245398, 22 pages.
Barbas, et al., "Association Rule Mining Using Max Pattern Transactions", U.S. Appl. No. 17/495,916, filed Oct. 7, 2021.
Ghatage, Rahul Anil, "Frequent Pattern Mining Over Data Stream Using Compact Sliding Window Tree & Sliding Window Model", International Research Journal of Engineering and Technology (IRJET), vol. 02 Issue: 04, Jul. 2015, 7 pages.
Karim et al., "Mining maximal frequent patterns in transactional databases and dynamic data streams: A spark-based approach", Information Sciences 432 (2018) 278-300, Available online Dec. 5, 2017, DOI: 10.1016/j.ins.2017.11.064, 24 pages.

(Continued)

*Primary Examiner* — Baoquoc N To
(74) *Attorney, Agent, or Firm* — Gilbert Harmon, Jr.

(57) ABSTRACT

Embodiments of the present invention provide systems and methods for associating rule mining. By way of example, embodiments obviate or mitigate performance and stability problems associated with conventional association rule mining approaches, by proposing concepts implementing association rule mining using rolling filtering bitmaps over dynamic data.

20 Claims, 5 Drawing Sheets

(56) References Cited

OTHER PUBLICATIONS

Lin et al., "A Fast Association Rule Algorithm Based on Bitmap and Granular Computing", The IEEE International Conference on Fuzzy Systems, 2003, pp. 678-683.

List of IBM Patents or Patent Applications Treated as Related. Filed Oct. 7, 2021, 2 pages.

Qiao et al., "A Tree Structure Frequent Pattern Mining Algorithm Based on Hybrid Search Strategy and Bitmap", IEEE International Conference on Intelligent Computing and Intelligent Systems, Nov. 20, 2009, 5 pages.

Mell et al., "The NIST Definition of Cloud Computing", Recommendations of the National Institute of Standards and Technology, Special Publication 800-145, Sep. 2011, 7 pages.

* cited by examiner

ASSOCIATION RULE MINING

TECHNICAL FIELD

The technical character of the present invention generally relates to the field of data mining, and more particularly, Association Rule Mining (ARM) algorithms.

BACKGROUND

Association rule mining (ARM) is a widely used knowledge discovery technique and a known in field of the data mining. Since the introduction of ARM by Rakesh Agrawal, ARM has been utilized to identify patterns of data and/or association rules in large amounts of data (e.g., databases).

A primary aim of extracting knowledge from databases is to generate a large frequent itemset that is iterative. However, it is a complex task because generating frequent itemsets exhausts system resources. For instance, generating candidate itemsets and calculating the occurrence of a candidate itemset in a transaction set and subsequently in a database involves several iterations. Each iteration requires time and incurs heavy computation cost.

Further, if the data is dynamic (i.e., data of the database changes over time), conventional ARM algorithms need to rescan the entire database. Consequently, a large/high computation cost is incurred and, as such, conventional approaches are not feasible for real-time applications.

SUMMARY

The present invention seeks to provide a method for Association Rule Mining (ARM) that may be employed with dynamic data and/or addresses the issue of efficiently consuming dynamic data. Such a method may be computer-implemented. That is, such a method may be implemented in a computer infrastructure having computer executable code tangibly embodied on a computer readable storage medium having programming instructions configured to a perform a proposed method. The present invention further seeks to provide a computer program product including computer program code for implementing the proposed concepts when executed on a processor. The present invention yet further seeks to provide a system for ARM of data.

According to an aspect of the present invention there is provided a computer-implemented method for association rule mining in data comprising first and second variables each having a set of possible values. The method comprises generating a first filtering bitmap representing, for each of a plurality of values of the first variable, a set of values for the second variable. The method also comprises generating a second filtering bitmap based on values of the second variable. The method further comprises identifying in the second filtering bitmap a list of frequent itemsets based on positional n-bit combinations per bitmap size S combinations. The method yet further comprises identifying at least one of the itemsets of the list of frequent itemsets as a mining result between the first variable and the second variable.

Embodiments may be employed in combination with conventional/existing event data analysis systems and/or knowledge extraction systems. In this way, embodiments may integrate into legacy systems so as to improve and/or extend their functionality and capabilities. An improved data analysis system may therefore be provided by proposed embodiments.

According to another embodiment of the present invention, there is provided a computer program product for ARM in data comprising first and second variables each having a set of possible values, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

According to another aspect, there is provided a system for ARM in data comprising first and second variables each having a set of possible values. The system comprises a processor arrangement configured to perform the steps of: generating a first filtering bitmap representing, for each of a plurality of values of the first variable, a set of values for the second variable; generating a second filtering bitmap based on values of the second variable; identifying in the second filtering bitmap a list of frequent itemsets based on positional n-bit combinations per bitmap size S combinations; and identifying at least one of the itemsets of the list of frequent itemsets as a mining result between the first variable and the second variable.

Thus, there may be proposed a concept for ARM within dynamic data by employing a rolling filter bitmapping scheme for the dynamic data. For instance, such a concept may construct a rolling filtering bitmap (e.g. a Bloom filter) represent a set over the dynamic data.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

It should be understood that the FIGS. are merely schematic and are not drawn to scale. It should also be understood that the same reference numerals are used throughout the FIGS. to indicate the same or similar parts.

In the context of the present application, where embodiments of the present invention constitute a method, it should be understood that such a method can be a process for execution by a computer, i.e., is a computer-implementable method. The various steps of the method therefore can reflect various parts of a computer program, e.g., various parts of one or more algorithms.

Also, in the context of the present application, a (processing) system can be a single device or a collection of distributed devices that are adapted to execute one or more embodiments of the methods of the present invention. For instance, a system can be a personal computer (PC), a server or a collection of PCs and/or servers connected via a network such as a local area network, the Internet and so on to cooperatively execute at least one embodiment of the methods of the present invention.

Also, in the context of the present application, a system can be a single device or a collection of distributed devices that are adapted to execute one or more embodiments of the methods of the present invention. For instance, a system can be a personal computer (PC), a portable computing device (such as a tablet computer, laptop, smartphone, etc.), a set-top box, a server computer or a collection of PCs and/or server computers connected via a network such as a local area network, the Internet and so on to cooperatively execute at least one embodiment of the methods of the present invention.

The technical character of the present invention generally relates to data mining, and more particularly, to Association Rule Mining (ARM) mechanisms that may, for example, be employed with dynamic data (and thus be useful for recommending products and/or services). More specifically, embodiments of the present invention can provide systems and methods for ARM using technical features such as a rolling filter bitmapping scheme for dynamic data, which addresses the issue of efficiently consuming dynamic data in a stable way and without the need to rescan the entire data. For example, in embodiments, a rolling filtering bitmap (e.g., a Bloom filter) representing a set over the dynamic data is constructed.

An advantage of the aforementioned technical solution can be that it efficiently addresses the problem of using suitable memory bitmap structures to be able to consume dynamic continuous data in a stable way and without the need to rescan an entire database.

Embodiments can obviate or mitigate performance and stability problems associated with conventional ARM approaches, by providing a method, a system and a computer program product for ARM using In-Memory rolling filtering bitmaps over dynamic data.

By employing a filtered bit-mapping scheme over dynamic data, a space efficient and fast recommendation engine can be provided by the proposed concept(s). In particular, embodiments can provide a method/system for recommending a product by using in-memory rolling filtering bitmaps (e.g. Bloom filter) over dynamic data. Similarly, embodiments can implement ARM in a computer program product through the utilization of in-memory rolling filtering bitmaps over dynamic data.

A proposed embodiment can provide a computer-implemented method for association rule mining in data comprising first and second variables each having a set of possible values. The method can comprise: generating a first filtering bitmap representing, for each of a plurality of values of the first variable, a set of values for the second variable; generating a second filtering bitmap based on values of the second variable; identifying in the second filtering bitmap a list of frequent itemsets based on positional n-bit combinations per bitmap size S combinations; and identifying at least one of the itemsets of the list of frequent itemsets as a mining result as a mining result between the first variable and the second variable.

Thus, embodiments can provide an ARM method and algorithm by using the following technique steps:

(I) A composition of two binary filters can be obtained—the first filter can represent combinations of two variables (e.g., products per customer) and the second filter represents combinations of one of the two variable (e.g., products between themselves). The size of both filters can depend on the total size of the transactional data records, and they can be constructed by using positional n-bits per n-blocks.

(II) After the two filters are loaded, and by working first on the second filter, the same can facilitate automatic narrowing down of the final list of common n-itemsets based initially on a) the combinations obtained in the positional n-bits per individual block, and then b) based on the combinations obtained per total n-blocks.

(III) Finally, algebraic operations can be performed between both filters in order to identify and extract matches between the list of common n-itemsets from the second filter and the list of information from the first filter. In this way, a list of n-itemsets can be derived.

Such a proposed concept can provide significant improvements in performance when compared to conventional ARM approaches. Further, when required to process new information (e.g., customer transactions) arriving to the database, proposed embodiments do not need to re-start the association rule mining process from the beginning. In particular, by performing a rolling operation in the positional n-bits per individual block on both filters, proposed embodiments can accommodate the new transactional data without losing any of the previous calculations. In this way, the previous calculations can simply be updated. Embodiments can therefore support implementation in conjunction with dynamic data.

By way of example, according to proposed concepts, there can be provided a method for ARM over dynamic data relating to customers and associated products. That is, an example where the first variable is 'customers' and the second variable is 'products.' The method can support the provision of product recommendations using two main steps: (i) generating a rolling filtering bitmap (e.g., a Bloom Filter) representing the set of products per customer over the dynamic data; and (ii) based on the generated bitmap, generating a list of frequent itemsets. The method can also include the additional step of validating the generated list of itemsets (e.g., by performing one or more logical operations on the generated bitmap and the generated list of frequent itemsets).

In some embodiments, generating a first filtering bitmap can comprise initializing a bitmap with an initial, predetermined bit value in each position of the bitmap. Then, for each of the plurality of values of the first variable, values of the second variable can be hashed to respective positions in the first filtering bitmap. By way of example, hashing values can comprise: responsive to the first filtering bitmap being full prior to hashing values of the second value for a next value of the first variable to the first filtering bitmap, discarding a value of the first variable from its respective discarded position in the first filtering bitmap and hashing values of the second value for the next value of the first variable to the discarded position in the first filtering bitmap.

It is understood in advance that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
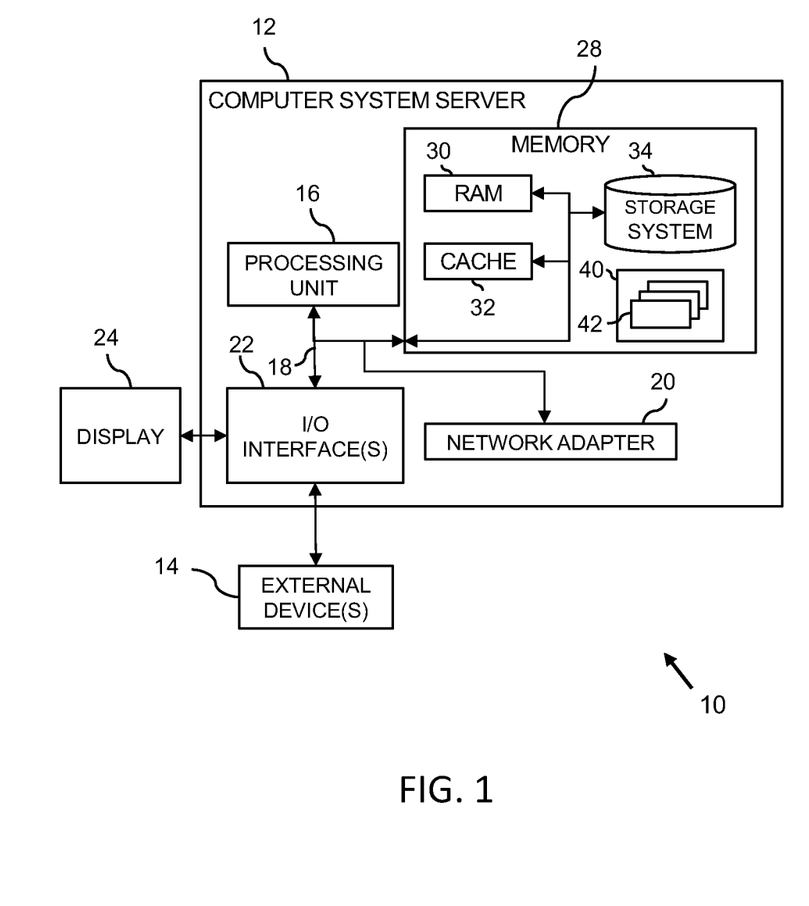
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 can include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all functions of an association rule mining (ARM) client 170 can be implemented as one or more of the program modules 42. Additionally, the ARM client 170 may be implemented as operable on separate dedicated processors or a single or several processors to provide the functionality described herein. In embodiments, the ARM client performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
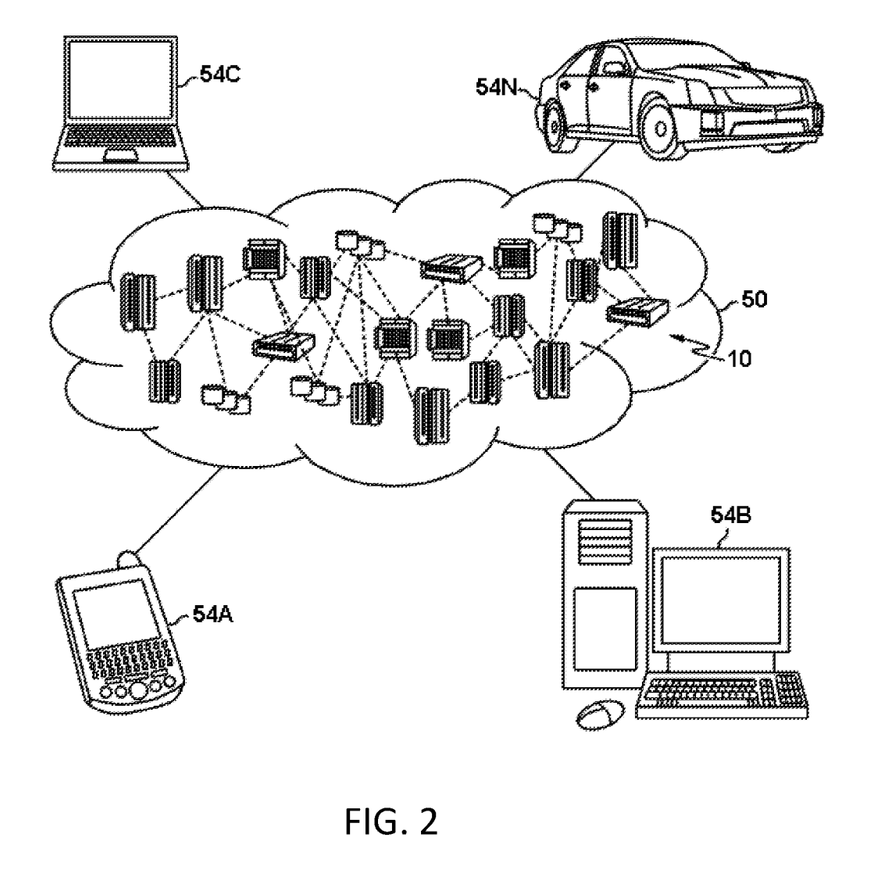
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
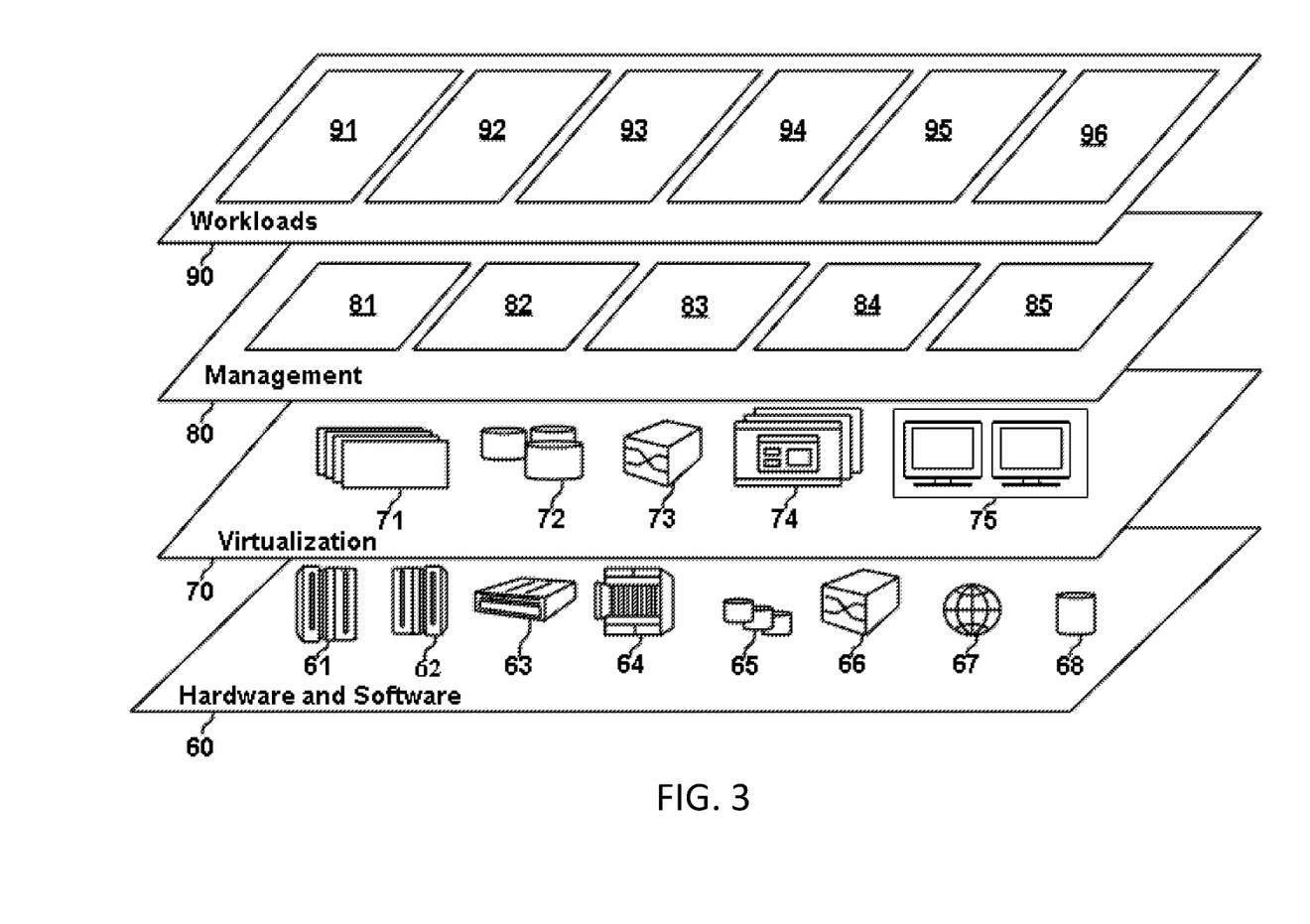
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and ARM processes 96 described herein. In accordance with aspects of the invention, the ARM processes 96 workload/function operates to perform one or more of the processes described herein.

Figure 4:
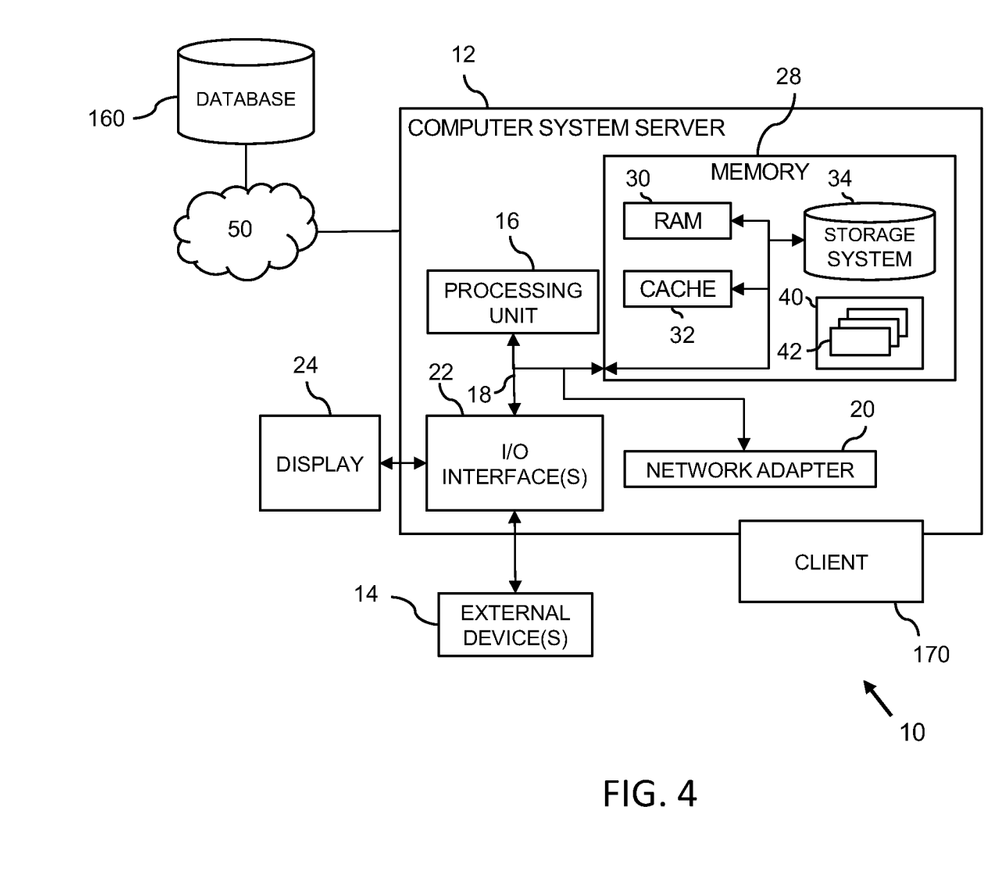
FIG. 4 depicts a cloud computing node according to another embodiment of the present invention.

FIG. 4 depicts a cloud computing node according to another embodiment of the present invention. In particular, FIG. 4 is another cloud computing node which comprises a same cloud computing node 10 as FIG. 1. In FIG. 4, the computer system/server 12 also comprises or communicates with an ARM client 170, and a database 160.

In accordance with aspects of embodiments of the present invention, the ARM client 170 can be implemented as one or more program code in program modules 42 stored in memory as separate or combined modules. Additionally, the ARM client 170 can be implemented as separate dedicated processors or a single or several processors to provide the function of these tools. While executing the computer program code, the processing unit 16 can read and/or write data to/from memory, storage system, and/or I/O interface 22. The program code executes the processes of the embodiments of the invention.

By way of example, ARM client 170 can be configured to communicate database 160 via a cloud computing environment 50. As discussed with reference to FIG. 2, for example, cloud computing environment 50 may be the Internet, a local area network, a wide area network, and/or a wireless network. In embodiments of the proposed ARM mechanism, the database 160 can provision data to the ARM client 170. One of ordinary skill in the art would understand that the ARM client 170 and database 160 can communicate directly. Alternatively, a relay agent may be used as an intermediary to relay messages between ARM client 170 and database 160 via the cloud computing environment 50.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
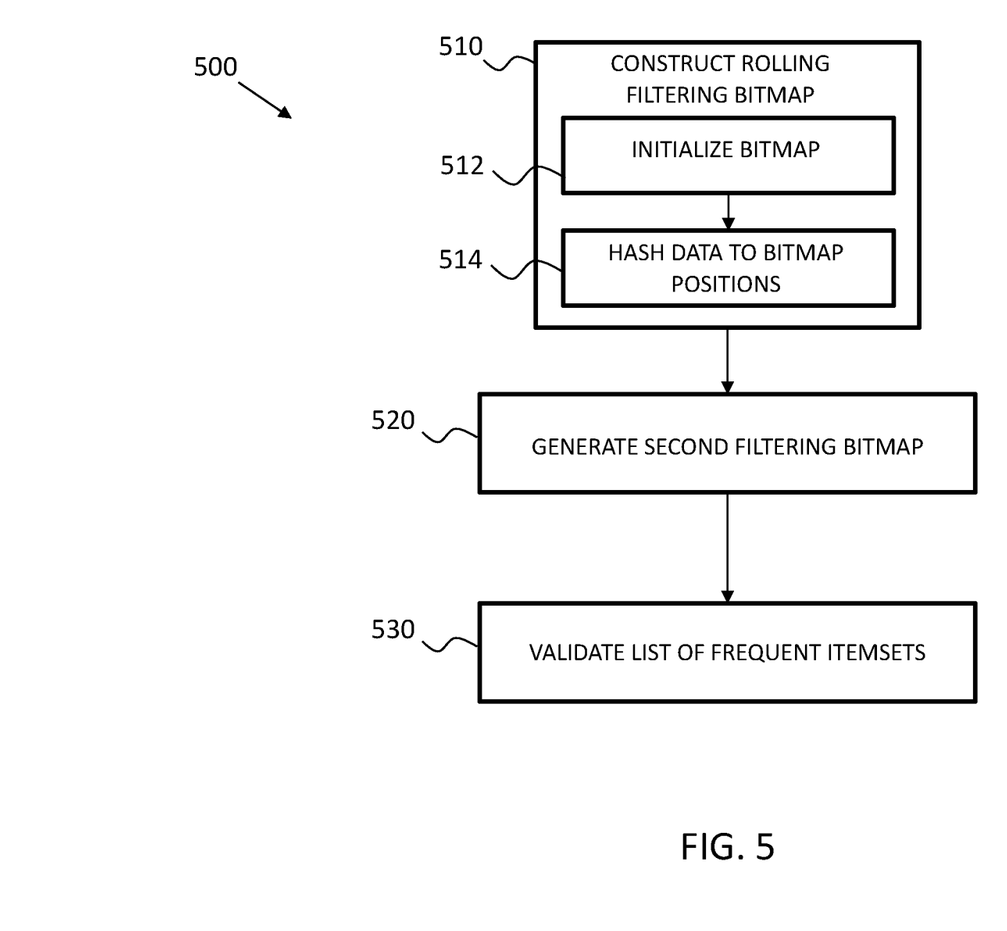
FIG. 5 is a simplified flow diagram of a method for association rule mining in data according to an exemplary embodiment.

FIG. 5 shows an exemplary flow diagram for performing aspects of embodiments of the present invention. The steps of FIG. 5 can be implemented in the environment of FIGS. 1 and 4, for example. As noted above, the flowchart(s) can illustrate the architecture, functionality, and operation of possible implementations of systems, methods, and computer program products as already described herein in accordance with the various embodiments of the present invention. The flowchart and block diagrams in the figures can illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 5, there is depicted a flow diagram of a method 500 for ARM according to an exemplary embodiment. For this example, we consider its application to/with a (statistically significant) sample of dynamic customer/products data as defined in Table 1 below.

| Customer | Products |
|---|---|
| ABC | {SPSS Statistics, IoT Platform, Quantum Offering} |
| DEF | {SPSS Statistics, IoT Platform, DB2} |
| GHI | {SPSS Statistics, IoT Platform, DB2, Edge Server} |
| JKL | {IoT Platform, DB2, Edge Server} |
| MNO | {SPSS Statistics, IoT Platform} |
| PQR | {SPSS Statistics, Quantum Offering, Edge Server} |
| ... | {... |

In step 510 of the method, a rolling filtering bitmap (e.g., a Bloom filter) representing the set of products per customer over the dynamic data can be constructed.

The bitmap can be configured to represent an initial stage of the process and can be based on the number of customers N. The size of the bitmap S where $S=((P+1)\times N)$ can be defined based on the number of products P per itemset. As such, the bitmap can be first initialized (in substep 512) with '0' where the P positions of the bitmap (positional bit) represent the SUM of a product, the data can then be hashed (i.e., mapped) to positions in the bitmap (in substep 514).

For the hashing substep 514, if the bitmap is not full, the next/following customer can be added in the dynamic sequence to the bitmap. If the bitmap is full, the oldest customer can be dropped from the bitmap and a new customer can be added to the rolling filtering bitmap.

Referring to Table 1 above, and considering the sample data provided wherein the minimum support mn can be chosen to equal two (i.e. mn=2, such that two is the number of customers that contains a pattern is called the support for this pattern) and wherein S=5, a 5-bit probabilistic bitmap filter with size five and initialized with 0 is generated as:

00000 00000 00000 00000 00000

Considering the first five customers in Table 1 above, for the above bitmap filter, the first position of the filter can represent customer "ABC", the second position can represent customer "DEF", the third position can represent customer "GHI", the fourth position can represent customer "JKL" and the fifth position can represent customer "MNO". Thus, by adding the product "SPSS Statistics" to the bitmap filter it becomes:

00001 00001 00001 00000 00001

It is seen that the fourth position of the above filter has not changed because customer "JKL" does not include the product "SPSS Statistics". In other words, the product "SPSS Statistics" can hash to positions 1, 2, 3 and 5.

Next, the product "IoT Platform" can be added to the filter. Here, because each of the first five customers includes the product "IOT Platform", it can hash to positions 1, 2, 3, 4 and 5. The bitmap filter thus becomes:

00011 00011 00011 00010 00011

In the same manner, the products "DB2", "Quantum Offering" and "Edge Server" can be added to the filter. Specifically, for the first five customers of Table 1 above: "DB2" can hash to positions 2, 3 and 4; "Quantum Offering" can hash to position 1; and "Edge Server" can hash to positions 3 and 4. The filter therefore becomes:

01011 00111 10111 10110 00011

The filtering bitmap can be at rolling stage when the bitmap is full. In this case, the oldest customer can be dropped, and new customers can be added to the rolling bitmap in this stage. For the example data of Table 1, the customer "ABC" can be dropped from the first position of the filter (oldest customer), and next customer "PQR" can be added to the first position of the filter (by hashing its products (SPSS Statistics, Quantum Offering, Edge Server)

to the first position of the bitmap). As a result, the filtering bitmap can be updated to become:

11001 00111 10111 10110 00011

Based on the final stage of the filtering bitmap, the number of bits of each position of the filtering bitmap having a value greater than or equal to ms by S can then be calculated. For these, the related products can be determined to be in a frequent 1-itemset. Thus, for the example above, a frequent (and unique) 1-itemset can be: {SPSS Statistics, IoT Platform, DB2, Edge Server} (position 3 of the filtering bitmap with SUM=4).

In step 520 of the method, a second filtering bitmap can be generated.

Initially a 2-itemsets filtering bitmap of size (P−1)×(P−1) can be constructed, and where each position of the filter can be initialized with 0. Returning to Table 1 above, and by considering the sample data provided where we have defined P=5 (i.e., 5 products in total), which can result in a 4-bit probabilistic bitmap filter with size 4 as:

0000 0000 0000 0000

In this example, each position of the filter can refer respectively to products "IoT Platform", "DB2", "Quantum Offering" and "Edge Server", and each bit (in each position) can refer respectively (from right to left) to products "SPSS Statistics", "IoT Platform", "DB2" and "Quantum Offering".

Consequently, by adding the product "SPSS Statistics" (which can hash to position 1, 2 and 4 respectively "IoT Platform", "DB2" and "Edge Server") to the filter it can become:

0001 0001 0000 0001

Next by adding the product "IoT Platform" (which can hash to position 2 and 4 respectively "DB2" and "Edge Server") to the filter it can become:

0001 0011 0000 0011

Next by adding the product "DB2" (which can hash to position 4 "IBM Edge Server") to the filter it can become:

0001 0011 0000 0111

Finally, by adding the product "Quantum Offering" (which does not have any combination with the products chosen to form the positional filter) to the filter it can become (no changes):

0001 0011 0000 0111

In this case, there are six combinations where the support can be greater than (or equal to) mn=2. Accordingly, the conclusion of the 2-itemsets filtering bitmap can be that the same provides six 2-itemsets, consequently being:

The first position of the filter 0001 ("IoT Platform") can refer to a one 2-itemsets combination defined as {SPSS Statistics, IoT Platform}

The second position of the filter 0011 ("DB2") can refer to a two 2-itemsets combination defined as {SPSS Statistics, DB2} (first bit) and {IoT Platform, DB2} (second bit)

The third position of the filter 0000 ("Quantum Offering") does not offer any combination of products The fourth position of the filter 0111 ("Edge Server") can refer to a three 2-itemsets combination defined as {SPSS Statistics, Edge Server} (first bit), {IoT Platform, Edge Server} (second bit) and {DB2, Edge Server} (third bit)

The list can then be defined as the following 2-itemsets: {{SPSS Statistics, IoT Platform}, {SPSS Statistics, DB2}, {IoT Platform, DB2}, {SPSS Statistics, Edge Server}, {IoT Platform, Edge Server}, {DB2, Edge Server}}

However, the following rule can be used to extend the 2-itemsets to 3-itemsets:

a) {SPSS Statistics, IoT Platform} AND {SPSS Statistics, DB2} AND {IoT Platform, DB2}
   {SPSS Statistics, IoT Platform, DB2}
b) {SPSS Statistics, IoT Platform} AND {SPSS Statistics, Edge Server} AND {IoT Platform, Edge Server}
   {SPSS Statistics, IoT Platform, Edge Server}
c) {SPSS Statistics, DB2} AND {SPSS Statistics, Edge Server} AND {DB2, Edge Server}
   {SPSS Statistics, DB2, Edge Server}

More generally, any 3 frequent 2-itemsets A, B and C, can be extended to a 3-itemset D:

If $A \cap B = B \cap A$ and if $C = ((A \cup B) \setminus (A \cap B))$ then $D = ((A \cap B) \cup C)$ (this rule can also be extended to any frequent n-itemsets)

Thus, for the step 520 of the method applied to the example of Table 1, the list of frequent itemsets can be generated as:

{{SPSS Statistics, IoT Platform, DB2}, {SPSS Statistics, IoT Platform, Edge Server}, {SPSS Statistics, DB2, Edge Server}}

In a step 530 of the method 500, the generated list of frequent itemsets derived from the second step 520 can be validated against the rolling filtering bitmap calculated from step 510. Such validation is undertaken by performing an AND operation between the rolling filtering bitmap and the list of itemsets.

That is, for the example data of Table 1, the rolling filtering bitmap calculated from step 510 above is:

11001 00111 10111 10110 00011 and the 3-itemsets generated from step 520 are:

{{SPSS Statistics, IoT Platform, DB2}, {SPSS Statistics, IoT Platform, Edge Server}, {SPSS Statistics, DB2, Edge Server}}

Specifically, in this example, by performing an AND operation between the rolling filtering bitmap and the list of itemsets, it can be determined that the 3-itemset {SPSS Statistics, IoT Platform, DB2} is represented in positions 2 and 3 of the rolling filtering bitmap respectively (00111 10111, where the first bit digit represents "SPSS Statistics", the second bit digit represents "IoT Platform" and the third bit digit represents "DB2").

Further, it can be determined that the 3-itemset {SPSS Statistics, IoT Platform, Edge Server} is represented in position 3 (10111) and that the 3-itemset {SPSS Statistics, DB2, Edge Server} is also represented in position 3 (10111).

Because only the 3-itemset {SPSS Statistics, IoT Platform, DB2} satisfies the condition minimum support mn=2, we can have as final result:

{SPSS Statistics, IoT Platform, DB2}

That is, the AND operation effectively can act as an operation for comparing the rolling filtering bitmap and the list of itemsets. Other comparison techniques can be used to determine which itemsets of the list satisfy a minimum support condition.

As should now be understood by those of skill in the art, in embodiments of the present invention, the ARM mechanism can provide numerous advantages over conventional data mining approaches. These advantages can include, but are not limited to, efficient consumption of dynamic data in a stable way and without the need to rescan entire data. In embodiments of the present invention, this technical solution can be accomplished by using in-memory rolling filtering bitmaps over dynamic data.

In still further advantages to a technical problem, the systems and processes described herein can provide a computer-implemented method for efficient ARM with respect to multilevel knowledge-based transactional databases, and such databases can be provided on (or via) a distributed communication network. In this case, a computer infrastructure, such as the computer system shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for association rule mining (ARM) in data comprising first and second variables each having a set of possible values, the method comprising:
    generating a first filtering bitmap representing, for a plurality of values of the first variable, a set of values for the second variable;
    generating a second filtering bitmap based on values of the second variable;
    identifying in the second filtering bitmap a list of frequent itemsets based on positional n-bit combinations per bitmap size S combinations; and
    identifying at least one of the itemsets of the list of frequent itemsets as a mining result between the first variable and the second variable.

2. The computer-implemented method of claim 1, wherein generating a first filtering bitmap comprises:
    initializing a bitmap with an initial, predetermined bit value in positions of the bitmap; and
    for the plurality of values of the first variable, hashing values of the second variable to respective positions in the first filtering bitmap.

3. The computer-implemented method of claim 2, wherein hashing values comprises:
    responsive to the first filtering bitmap being full prior to hashing values of the second value for a next value of the first variable to the first filtering bitmap, discarding a value of the first variable from its respective discarded position in the first filtering bitmap and hashing values of the second value for the next value of the first variable to the discarded position in the first filtering bitmap.

4. The computer-implemented method of claim 1, wherein generating a second filtering bitmap comprises:

initializing a bitmap of size (P−1)×(P−1), where P is equal to the number of possible values for the second variable; and
for a set values of the second variable, hashing values of the second variable to respective positions in the bitmap.

5. The computer-implemented method of claim 1, wherein identifying at least one of the itemsets of the list of frequent itemsets as a mining result comprises:
    performing a logical operation with the first filtering bitmap and the list of frequent itemsets.

6. The computer-implemented method of claim 5, wherein identifying at least one of the itemsets of the list of frequent itemsets as a mining result comprises:
    assessing a logical operation result with reference threshold to determine whether to identify an itemset of the frequent itemsets as a mining result.

7. The computer-implemented method of claim 1, wherein the first variable is configured to represent a customer and wherein the second variable is configured to represent a product.

8. The computer-implemented method of claim 1, wherein the data comprises dynamic data.

9. A computer program product for association rule mining (ARM) in data comprising first and second variables having sets of possible values, the computer program product comprising a computer readable storage medium having program instructions embodied therewith, the program instructions executable by a processing unit to cause the processing unit to perform a method comprising:
    generating a first filtering bitmap representing, for a plurality of values of the first variable, a set of values for the second variable;
    generating a second filtering bitmap based on values of the second variable;
    identifying in the second filtering bitmap a list of frequent itemsets based on positional n-bit combinations per bitmap size S combinations; and
    identifying at least one of the itemsets of the list of frequent itemsets as a mining result between the first variable and the second variable.

10. The computer program product of claim 9, wherein generating a first filtering bitmap comprises:
    initializing a bitmap with an initial, predetermined bit value in positions of the bitmap; and
    for the plurality of values of the first variable, hashing values of the second variable to respective positions in the first filtering bitmap.

11. The computer program product of claim 10, wherein hashing values comprises:
    responsive to the first filtering bitmap being full prior to hashing values of the second value for a next value of the first variable to the first filtering bitmap, discarding a value of the first variable from its respective discarded position in the first filtering bitmap and hashing values of the second value for the next value of the first variable to the discarded position in the first filtering bitmap.

12. The computer program product of claim 9, wherein generating a second filtering bitmap comprises:
    initializing a bitmap of size (P−1)×(P−1), where P is equal to the number of possible values for the second variable; and
    for a set values of the second variable, hashing values of the second variable to respective positions in the bitmap.

13. A system for association rule mining (ARM) in data comprising first and second variables having sets of possible values, the system comprising:

a processor arrangement configured to perform the steps of:

generating a first filtering bitmap representing, for a plurality of values of the first variable, a set of values for the second variable;

generating a second filtering bitmap based on values of the second variable;

identifying in the second filtering bitmap a list of frequent itemsets based on positional n-bit combinations per bitmap size S combinations; and identifying at least one of the itemsets of the list of frequent itemsets as a mining result between the first variable and the second variable.

14. The system of claim 13, wherein generating a first filtering bitmap comprises:

initializing a bitmap with an initial, predetermined bit values in positions of the bitmap; and for the plurality of values of the first variable, hashing values of the second variable to respective positions in the first filtering bitmap.

15. The system of claim 14, wherein hashing values comprises:

responsive to the first filtering bitmap being full prior to hashing values of the second value for a next value of the first variable to the first filtering bitmap, discarding a value of the first variable from its respective discarded position in the first filtering bitmap and hashing values of the second value for the next value of the first variable to the discarded position in the first filtering bitmap.

16. The system of claim 13, wherein generating a second filtering bitmap comprises:

initializing a bitmap of size (P−1)×(P−1), where P is equal to the number of possible values for the second variable; and for a set values of the second variable, hashing values of the second variable to respective positions in the bitmap.

17. The system of claim 13, wherein identifying at least one of the itemsets of the list of frequent itemsets as a mining result comprises:

performing a logical operation with the first filtering bitmap and the list of frequent itemsets.

18. The system of claim 17, wherein identifying at least one of the itemsets of the list of frequent itemsets as a mining result comprises:

assessing a logical operation result with reference threshold to determine whether to identify an itemset of the frequent itemsets as a mining result.

19. The system of claim 13, wherein the first variable is configured to represent a customer and wherein the second variable is configured to represent a product.

20. The system of claim 13, wherein the data comprises dynamic data.

* * * * *